United States Patent [19]

Coles

[11] 3,949,638

[45] Apr. 13, 1976

[54] ELECTRONIC MUSICAL INSTRUMENT

[76] Inventor: Donald K. Coles, 2505 Capitol Ave., Fort Wayne, Ind. 46806

[22] Filed: Oct. 18, 1974

[21] Appl. No.: 515,969

[52] U.S. Cl. ................ 84/1.01; 84/445; 84/DIG. 7; 200/11 DA

[51] Int. Cl.[2] ........................ G01H 1/00; G10H 5/02

[58] Field of Search ............ 84/1.01, 1.24, 445–449, 84/DIG. 7; 200/11 DA

[56] References Cited

UNITED STATES PATENTS

| | | | |
|---|---|---|---|
| 2,539,130 | 1/1951 | Grudin | 84/445 UX |
| 3,023,659 | 3/1962 | Bode | 84/445 |
| 3,030,848 | 4/1962 | Wick | 84/445 |
| 3,056,326 | 10/1962 | Seybold | 84/445 X |
| 3,674,907 | 7/1972 | Derry | 84/1.01 |
| 3,800,060 | 3/1974 | Hallman, Jr. | 84/1.24 |
| 3,824,325 | 7/1974 | Obayashi et al. | 84/1.01 |
| 3,828,285 | 8/1974 | Yokoyama et al. | 200/11 DA X |
| 3,836,909 | 9/1974 | Cockerell | 84/1.01 X |

*Primary Examiner*—L. T. Hix
*Assistant Examiner*—Stanley J. Witkowski

[57] ABSTRACT

An absolute pitch selector apparatus provides a set of audio-frequency tone signals for a musical instrument. These are selected from a larger number of tone generator circuits by means of a rotary pitch selector switch. Stationary input and output contacts of the switch are printed on the same side of a stationary circuit board. The output contacts are shaped like the arcs of circles that are coaxial with the single circle of input contacts. A rotor carries a first set of spring contacts bearing on the stationary input contacts, a second set of spring contacts bearing on the stationary output contacts, and bridging conductors.

4 Claims, 13 Drawing Figures

FIG-8

ELECTRONIC MUSICAL INSTRUMENT

BACKGROUND OF THE INVENTION

1. Field of the Invention

A transposing apparatus whereby each sound produced is uniformly changed in pitch from that normally associated with the digital struck.

2. Description of the Prior Art

With an organ tuned in the conventional equitempered scale, a melody written in a particular key may have all its tones uniformly raised or lowered by a pitch changing mechanism; it will be recognized in that case as being the same melody, pitched higher or lower.

When a singer or instrumentalist is accompanied by an organ or piano, he often wishes the accompaniment to be pitched higher or lower than the music is written, to better match the range of his voice or instrument. This can be accomplished, without changing the fingering of the music as written, by means of a pitch changing switch which alters the connections between the tone generators and the digitals which actuate them. By changing the position of the switch, the absolute pitch of tones corresponding to the sequence of digitals may be uniformly raised by a fixed amount — say four semitones.

If the organ is tuned in a twelve tone scale which differs somewhat from the equitempered scale, then a change of pitch may affect the way a musical composition sounds. For example, if the tone generators are tuned in the one-quarter comma meantone scale, then a composition will probably sound pleasant at some pitches and discordant at others, but it will generally be recognizable as the same composition. Pitch changing switches are still useful with such scales, which may be called approximately equitempered scales.

The most satisfactory pitch changing system is one which can be set to a standard position in which middle A has a fundamental frequency of 440 Hz, and changed therefrom to at least eleven other positions in which the pitch is changed from the standard by an integral number of semitones.

Wick, in U.S. Pat. No. 3,030,848, describes a pitch changing switch which has stationary contacts on one stationary printed circuit board which are connected to the tone generator circuits. Stationary contacts on a second stationary printed circuit board are connected to the digital switches. Between the two stationary circuit boards is a rotor.

Bode, in U.S. Pat. No. 3,023,659, describes a pitch changing system in which the pitch of only the top octave of tone generators is switched; lower octaves of tone generators are derived from the top octave by twelve chains of binary frequency dividers.

It is known that binary frequency dividers slaved to a top octave of twelve master oscillators produce a tone quality which is generally inferior to that produced by independent tone generators, but that good tone quality can be obtained by using two or more separate sets of master oscillators, each with its own set of binary frequency dividers. The great majority of musical instruments do not presently contain pitch changers, largely because of their size, expense, unreliability, and the added complexity of wiring required for their use.

SUMMARY OF THE INVENTION

The absolute pitch selector apparatus provides a set of audio frequency tone signals for the musical instrument, selected from a larger number of tone generator circuits by means of a pitch selector switch. The rotary pitch selector switch is mounted on the same circuit board that holds the tone generator circuits. The stationary input contacts of the selector switch are printed on one side of the circuit board in a circular array. Individual stationary input contacts are connected to individual tone generator circuits. The output leads from the pitch selector apparatus are connected to the stationary output contacts of the switch. These are printed on the same side of the circuit board as the stationary input contacts. The output contacts are shaped like the arcs of circles, which are coaxial with the single circle of input contacts.

A rotor carries a first set of spring contacts sliding along the stationary input contacts, a second set of spring contacts sliding along the stationary output contacts, and bridging conductors. Each bridging conductor is formed integrally with the two spring contacts it connects.

For an apparatus with P switch positions and N output leads, the required number of tone generator circuits is N+P−1.

One object of my invention is to construct a compact pitch selector apparatus providing reliable operation over a long period of time without maintenance.

An additional object of my invention is to provide apparatus that can be easily produced and incorporated into a musical instrument.

DESCRIPTION OF THE PREFERRED EMBODIMENT

Figure 1:
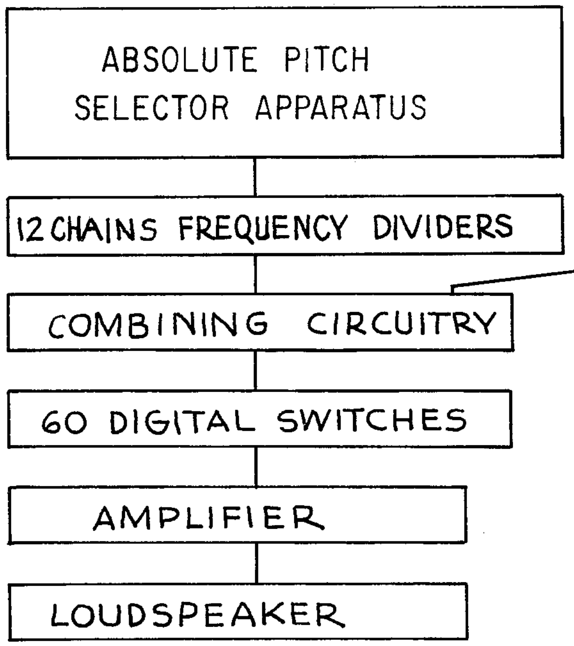
FIG. 1 is a block diagram of a pitch changing electronic organ.

In order to obtain good tone quality, my organ is provided with two separate pitch selector apparatus, as shown in FIG. 1. When either selector apparatus is set to its standard position, it provides twelve tone output leads with tones ranging from C # at about 2217 Hz to C at about 4186 Hz. These output leads are connected to the audio inputs of twelve chains of frequency dividers. Each chain of frequency dividers is an integrated circuit of the type SCL4024A, manufactured by Solid State Scientic, Inc. This integrated circuit package has a single audio input and seven outputs at frequencies below the input frequency by factors of 2,4,8,16,32,64,128. Thus the chain whose input is C # at 2217 Hz produces outputs of C # at 1108 Hz, 554 Hz, 277 Hz, etc. for the lower octaves of the organ.

Figure 2:
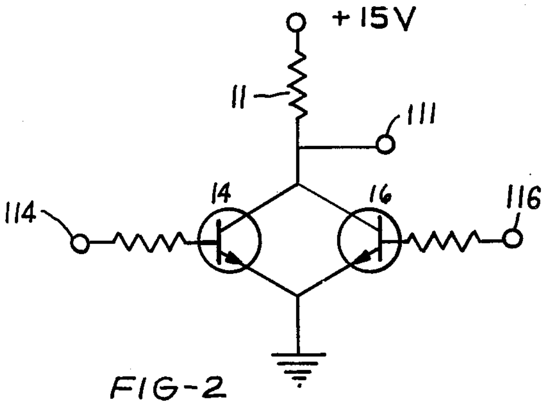
FIG. 2 diagrams combining circuitry for two sets of secondary tone generators.

Referring to FIG. 1, the combining circuitry combines the outputs of the two sets of chains of frequency dividers by means of 12 pairs of transistors, each pair having a common load resistor. Referring to FIG. 2, output leads producing the same tone from the two sets of chains of dividers are connected to the base terminals 114 and 116 of the two transistors; the combined output is taken from the common collector terminal 111. The digital switches, amplifier and loud-speaker are conventional units; their method of assembly in an organ is well known to the skilled artisan.

Figure 3:
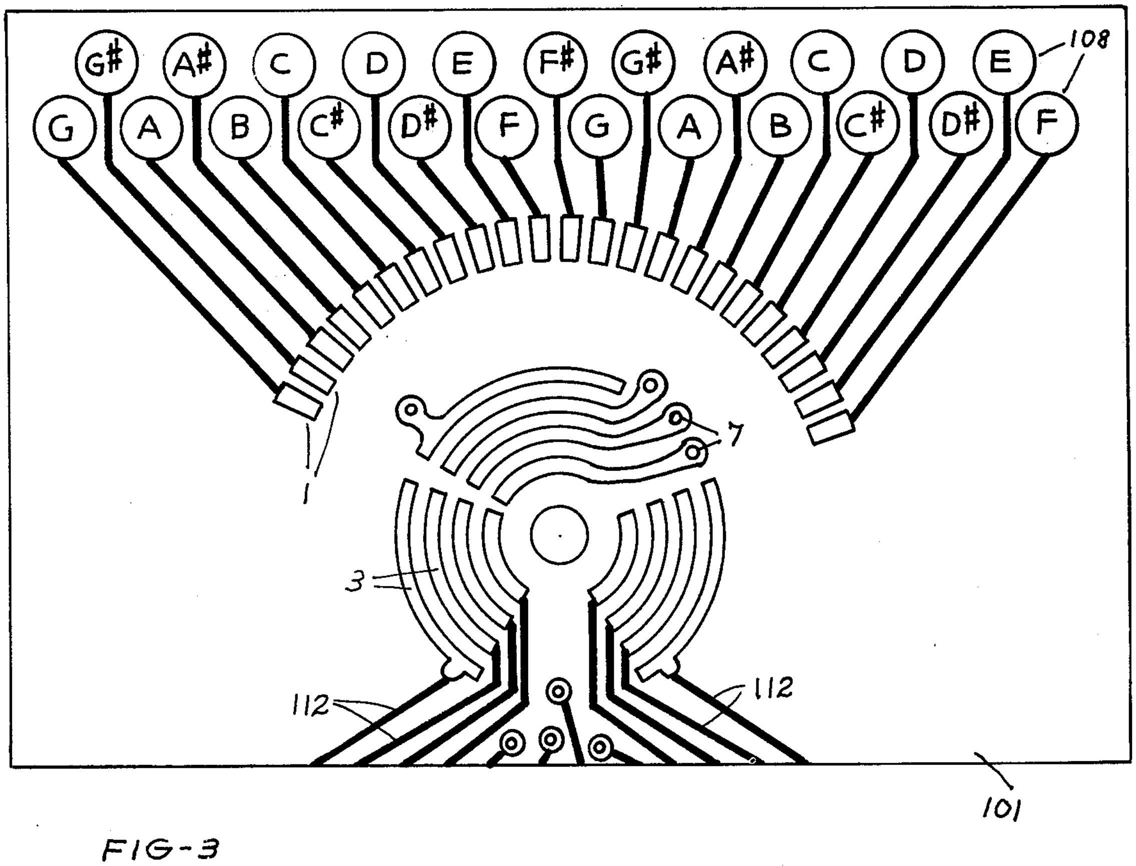
FIG. 3 shows the preferred arrangement of stationary contacts on the stationary circuit board of the pitch changing switch.

The pitch selector apparatus of FIG. 1 is detailed in FIGS. 3 to 8. FIG. 3 shos 23 tone generator circuits 108 ranging from G at 1,568 Hz to F at 5,588 Hz. These are contained in two integrated circuits of type MK50242, manufactured by the Mostek Corporation. The inputs of these two packages are connected to the second and third stage outputs of a seven stage frequency divider of the aforementioned SCL4024A type. The input of this in turn is connected to a crystal controlled oscillator of the S14R-2 type, manufactured by the Connor-Winfield Corporation. The two sets of 23 tone generator circuits are identical except that in one case the crystal oscillator is tuned to 5.340 MHz and in the other case it is tuned to 5.346 MHz.

Referring now to FIG. 3, the stator of my pitch changing switch is a circuit board 101 carrying a linear array of 23 small stationary contacts 1 arranged in a circle, with a center-to-center indexing angle between adjacent stationary contacts of 6°. These small stationary contacts are connected in sequence to the 23 primary tone generator circuits 108, all of which oscillate continuously. Twelve elongated stationary contacts 3 are shaped like arcs of circles, concentric with the circle of primary stationary contacts 1. These 12 stationary output contacts 3 are connected to 12 output leads 112.

Figure 4:
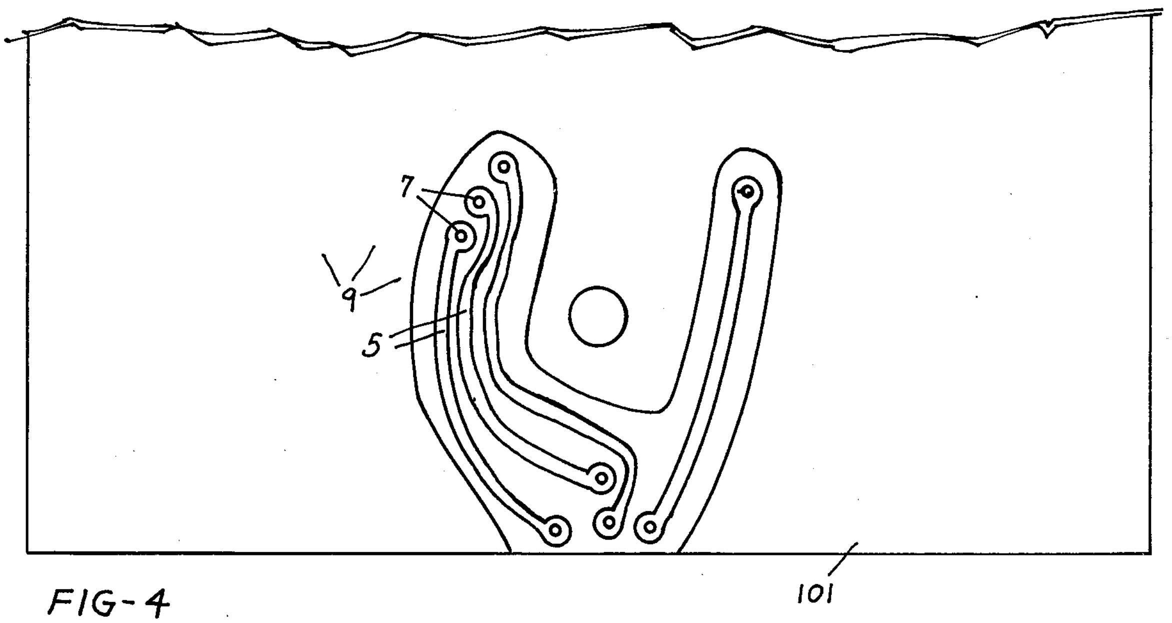
FIG. 4 shows the back of the stationary circuit board whose front side is shown in FIG. 3.

In order to maintain adequate spacing between conducting leads from the elongated stationary contacts, I use etched conductors on the back of the circuit board, indicated by the numeral 5 in FIG. 4. Connections to these conductors are made by plated-through holes, by methods well known to those skilled in the art of printed circuits. These plated-through holes are indicated by the numeral 7 in FIGS. 3 and 5. FIG. 3 also shows a common ground plane 9, from which conductors 5 are separated by the etching process.

Figure 5:
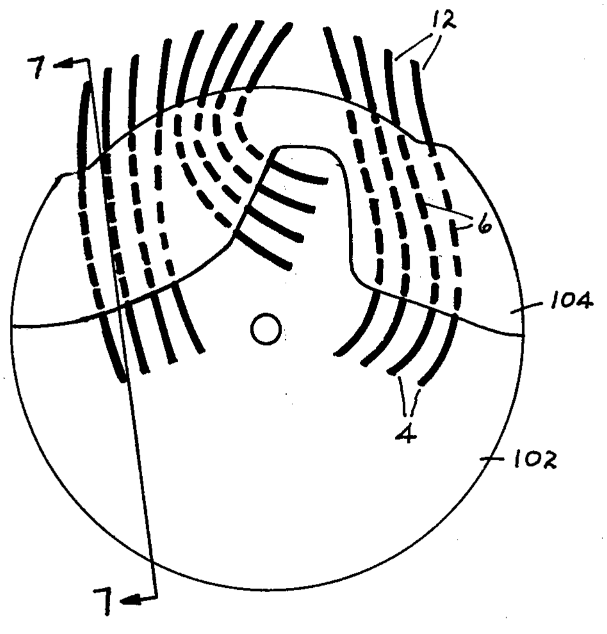
FIG. 5 shows a bottom view of the rotor.

FIG. 5 shows a view from the direction of the stationary circuit board of an insulating rotor 102. This supports a linear array of twelve small movable spring contacts 12, arranged in a circle so as to bear on the linear array of stationary contacts 1 on the stator. Each movable contact is spaced from its closest adjacent neighbors by the center-to-center indexing angle of 6°, and is connected by an electrical conductor 6 to one of 12 movable spring contacts 4, also supported on insulating rotor 102.

As is customary with rotary-type switches, a detent mechanism and travel-limiting stops are supplied (not shown). These ensure that there are just twelve stable operating positions, in each of which the movable contacts bear squarely on the stationary contacts. Each movable spring contact 4 slides on one of the twelve long stationary contacts 3 located on the stator. In the twelve different operating positions of the rotor, the linear array of twelve movable contacts bears on different twelve-member sequences of the linear array of primary stationary contacts. The angle that each elongated stationary contact 3 subtends at the axis of the switch should be approximately the product of the indexing angle multiplied by the number of switch positions. In the present case, where the indexing angle C is equal to 6° and the number P of switch positions is 12, the arc length of each elongated stationary contact should be approximately 12° × 6° or 72°.

To improve reliability and reduce wiring, the stationary contacts and their leads are formed by an etching process on a printed circuit board, which board also supports the primary tone generator circuits and the frequency divider chains.

Although it is essential that the linear array of input stationary contacts be connected to the sequence of tone generator circuits in their proper ascending order, as shown in FIG. 3, the arrangement of the elongated stationary contacts is somewhat arbitrary. The particular arrangement shown in FIG. 3 makes a compact switch and easy fabrication of the switch rotor.

Referring to FIG. 5, each small movable contact 12 is connected to its corresponding movable spring contact 4 by a conductor 6 which is integral with the two movable contacts themselves; all three being made of a spring material such as phosphorous bronze. The assembly of movable contacts and conductors is made in a single photo-etching process, also known as photofabrication and as chemical milling. The assembly is then cemented or soldered to the insulating rotor 102.

By making the spring contacts integral with the conductors, the tedious process of positioning and soldering individual spring contacts is eliminated, the cost of fabricating the assembly is reduced and reliability increased.

To facilitate handling of the spring contacts and conductors after the etching operation, temporary bridges are left between adjacent spring contacts by the etching process. These temporary bridges are indicated by the numeral 8 in FIG. 6. After the assembly has been electro-plated with rhodium, positioned on the insulating rotor 102 and cemented or soldered to it, the temporary bridges 8 are easily broken off, or removed by a shearing operation.

Figure 7:
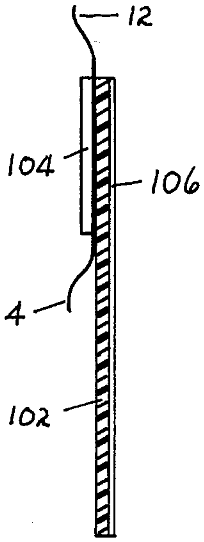
FIG. 7 is a cross sectional view of the rotor showing spring contacts.
Figure 6:
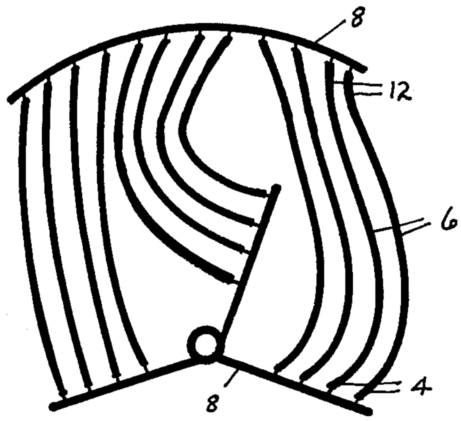
FIG. 6 shows temporary spacing bridges between the spring contacts.

When the movable contact assembly is attached to the insulating rotor disk by cement, the rotor is held in a press. In order to keep the cement from touching the press, and to increae the bond between contacts and insulating disk, a thin insulating cover 104 is placed over the central part of the movable contact assembly. This is shown in FIG. 5 and FIG. 7.

Each spring contact is bent away from the insulating rotor in a forming operation. FIG. 7 is a cross-sectional view showing spring contacts 12 and 4, insulating rotor 102, insulating cover 104, and a ground plane 106. The ground plane of the rotor is grounded through the metal rotor shaft and its bearing (not shown).

Figure 8:
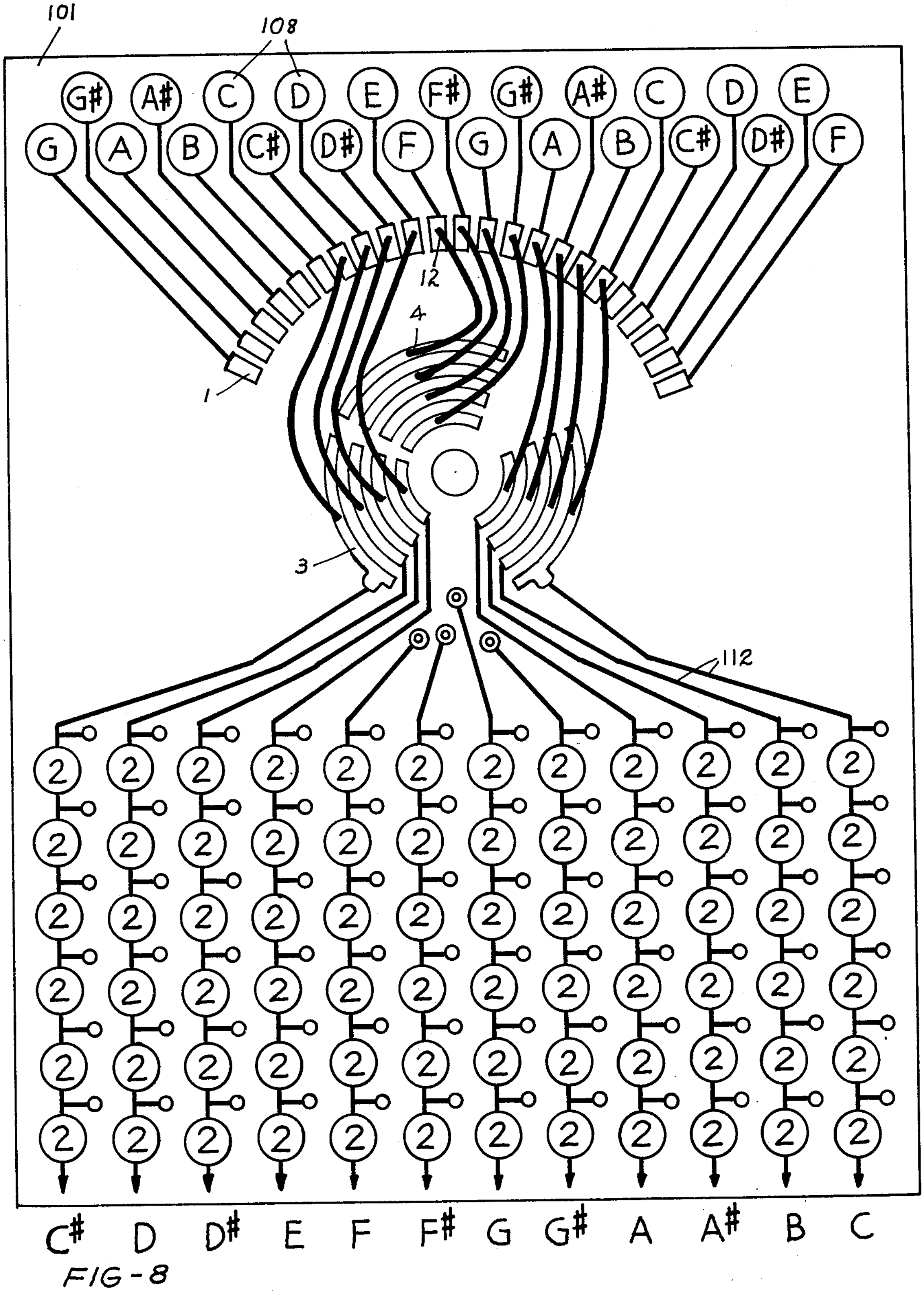
FIG. 8 shows the preferred arrangement of movable spring contacts and their interconnections, superimposed on the assembly of stationary contacts.

Referring to FIG. 8, twenty three tone generator circuits 108 are connected to the linear array of twenty three small stationary contacts 1. The 12 output leads 112 are connected to 12 chains of frequency dividers 2. Superimposed on the stator is shown the linear array of twelve movable contacts 12 connected to the set of twelve spring contacts 4. The movable contacts and their interconnections are shown in the standard position, and labeling of the chains of dividers corresponds to this standard position.

The twelve switch operating positions allow a pitch change upward by one to five semitones from the standard position, or downward by any number of semitones up to six. When the switch is turned 6° in a clockwise direction, the tone corresponding to each chain of dividers is raised one semitone. When the switch is turned twelve degrees in a counter-clock-wise direction from the standard position, each output pitch is two semitones lower than that indicated in FIG. 8, and so on.

OTHER EMBODIMENTS

Figure 9:
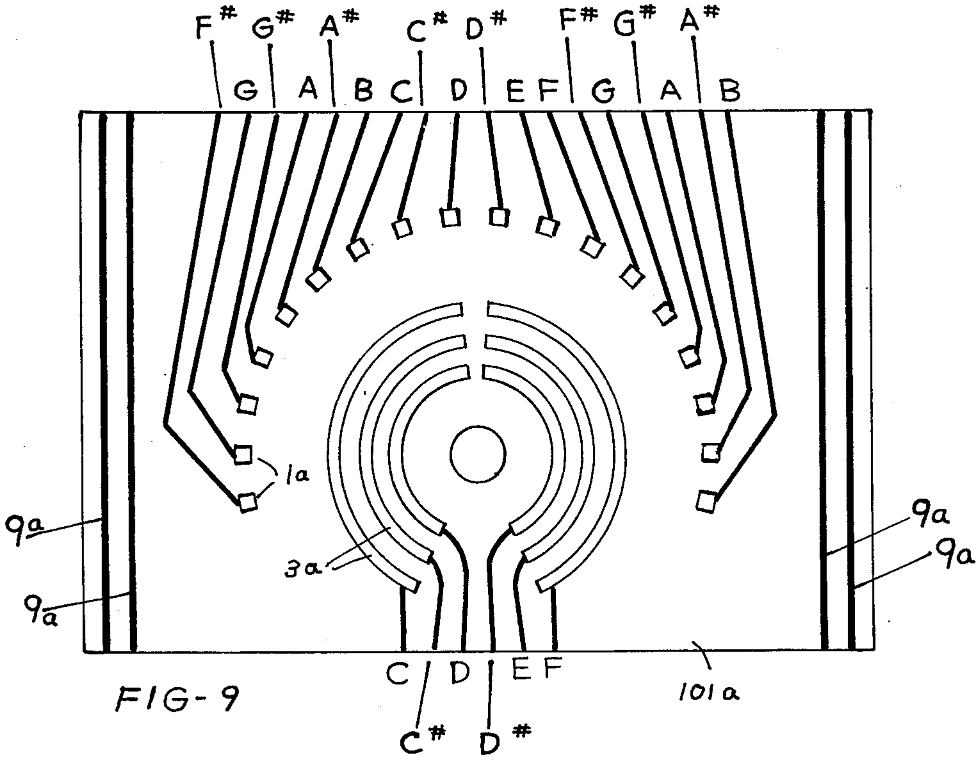
FIG. 9 shows an arrangement of stationary contacts for a second embodiment of the invention.
Figure 10:
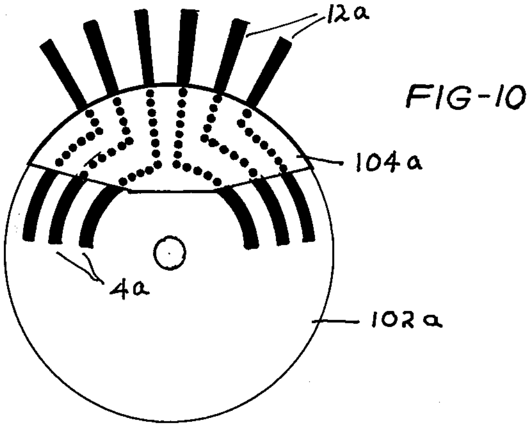
FIG. 10 shows the corresponding arrangement of movable contacts for the second embodiment.

The number of elongated stationary contacts may be either smaller than 12 or greater than 12. For example, FIG. 9 shows a second embodiment of my invention with only six elongated stationary contacts **3*a* and a linear array of only 18 stationary contacts 1*a*. In this case the common ground conductors 9*a* are on the front side of the printed circuit board. The arrangement of ground conductors provides some shielding against disturbances from other parts of the organ. Duplication of ground conductors on each edge facilitates separate testing of redundant ground connections. The arrangement of movable contacts to mate with these stationary contacts is shown in FIG. 10**. The larger indexing angle of twelve degrees makes positioning the rotor somewhat easier, and the switch occupies much less area on the circuit board even though this switch has 13 switch positions.

In this embodiment, other secondary circuits may be connected through a similar pitch changing switch on the other side of the circuit board, and turned by the same shaft. This complementary pitch changing switch may have a linear array of eighteen stationary contacts connected to tone generating circuits six semitones higher, so that output tones from the complementary switch will be six semitones higher. In the standard position the output tones from the first pitch changing switch are C to F, as indicated while the tones from the complementary switch could be the remainder of the octave from F to B. Such a pair of pitch changing switches is small and has the advantage of balanced spring forces on the stationary circuit board. Whereas the preceeding embodiments change pitch by musical intervals of a single semitone the pitch may be usefully changed by intervals of two or more semitones. A most satisfactory number of switch positions is given by the equation $P = 12/M$, where P is the number of switch positions and M is the musical interval in semitones between consecutive primary tone generator circuits. If M is increased to 2, then only six switch positions are needed, so that the indexing angle between successive positions can be increased to 24 or even 30°. In this case, and referring to FIG. 8, one side of the circuit board can carry a circle of input stationary contacts for the eleven primary tones G,A,B,C#,D#,F,G,A,B,C#,D# and elongated stationary contacts for the six output tones C#,D#,F,G,A,B, contacts for the other six output tones and eleven input tones can be printed on the other side of the circuit board.

Figure 11:
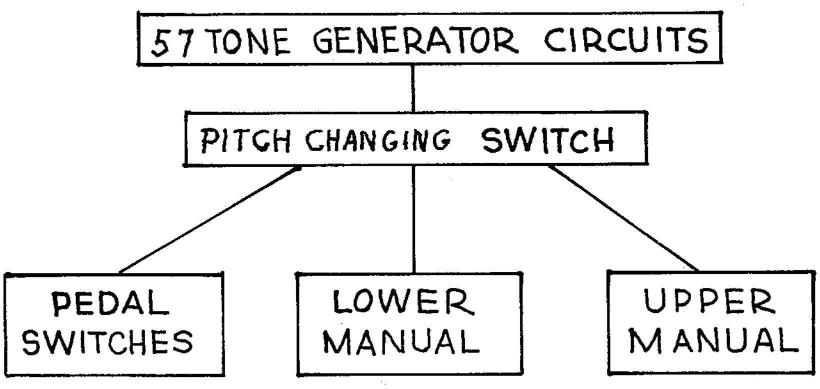
FIG. 11 is a block diagram showing an alternate inter-relationship of my pitch changing system.
Figure 12:
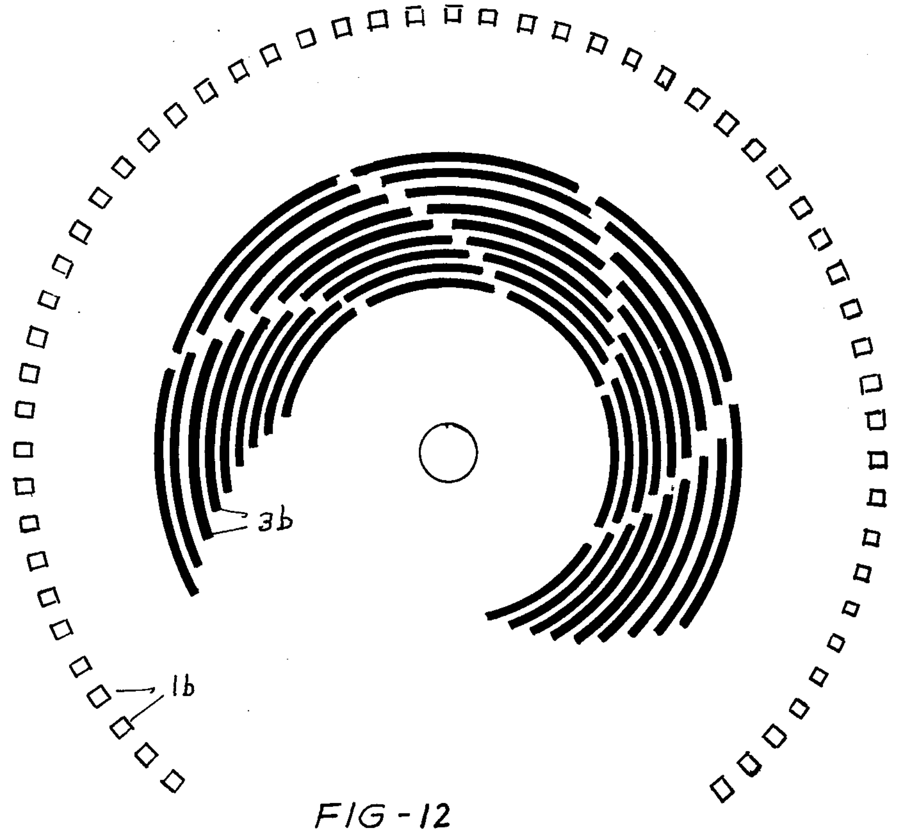
FIG. 12 shows an arrangement of stationary contacts for a third embodiment.
Figure 13:
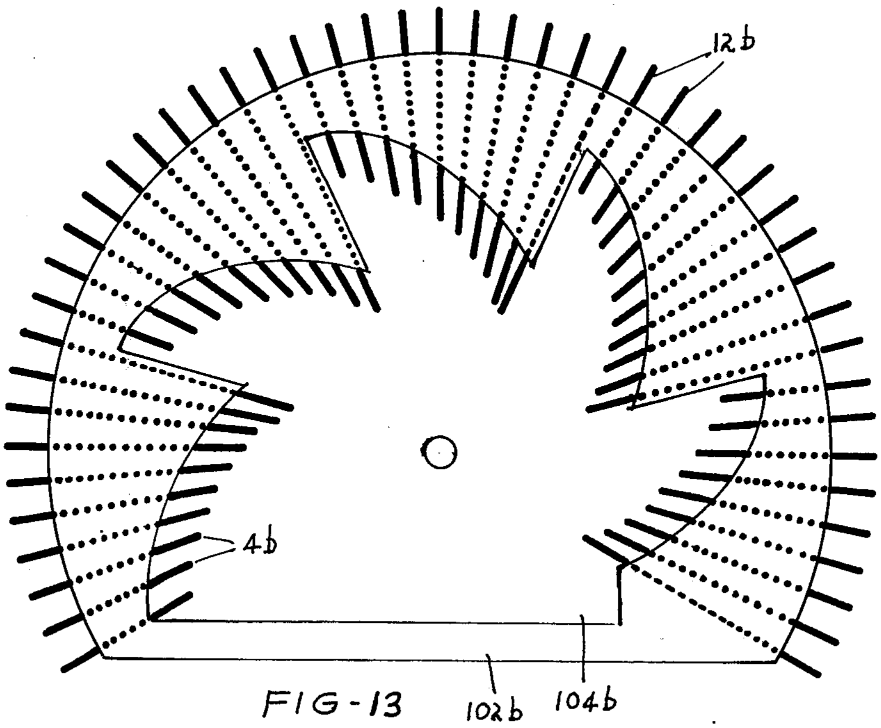
FIG. 13 shows the corresponding arrangement of movable contacts for the third embodiment.

Some electronic organs obtain improved tone quality by abandoning the divider system and using independent electronic oscillators throughout, as diagrammed in FIG. 11. Pitch changing in such an organ is more difficult, but the switch construction described for my preferred embodiment can be used for such a large number of independent oscillators. Referring to FIG. 11, the tone generator circuits are standard Hartley oscillators. These are connected through the pitch selection switch to the upper and lower manuals and the pedals, which are also conventional units. If the number of output leads from the switch is N and the number of switch positions is P, then the required number of tone generator circuits is N+P−1. Details of this pitch changing switch are shown in FIGS. 12 and 13. FIG. 12 indicates an arrangement of stationary contacts suitable for such a pitch changing switch, connecting a sequence of 57 tone generator circuits to a set of 49 digital switches. This switch would have a total of nine operating positions, allowing a change of pitch up or down from the standard position by any number of semitones up to and including four. The corresponding arrangement of movable contacts for such a switch is indicated in FIG. 13. In this case the indexing angle C is equal to five degrees. The set of forty nine variable pitch tone generators provides an electronic organ with excellent tone quality.

I claim:

1. In a musical instrument, an absolute pitch selector apparatus comprising:

- a plurality of tone generator circuits respectively arranged in a sequence having tones proceeding from low to high with a constant musical interval between adjacent tones of M semitones, where M is an integer in the range one to two inclusive,
- a set of N electrical output leads where N is a number smaller than the number of said tone generator circuits, said output leads providing apparatus outputs of N separate musical tones of selected pitch, wherein the improvement comprises:
- a stationary circuit board having first and second parallel sides,
- an insulating rotor mounted on said first side of said stationary circuit board, rotatable about a fixed axis perpendicular to said first side, having a plurality of P switch positions corresponding to the number of absolute pitch selections, said switch positions separated by an indexing angle of C°, where C is a number included in the range two to 60 inclusive,
- a linear array of N+P−1 stationary input contacts mounted on said first side of said stationary circuit board, arranged in the arc of a single circle, said single circle parallel to said first side of said stationary circuit board, centered on said axis, the center-to-center spacing between adjacent members of said linear array of stationary input contacts being C°, successive individual members of said linear array of stationary input contacts permanently connected to individual members of said sequence of tone generator circuits in order of increasing pitch,
- a set of N elongated stationary output contacts mounted on said first side of said stationary circuit board, each said elongated stationary output contact shaped like the arc of a circle, said circle parallel to said first side of said stationary circuit board, centered on said axis, each said arc of a circle subtending at said axis an angle at least as large as the product of said indexing angle C multiplied by P, the number of switch positions, individual members of said set of stationary output contacts connected to individual members of said electrical output leads, a linear array of N movable input spring contacts mounted on said insulating rotor, said N movable input spring contacts arranged in the arc of a single circle coaxial with said rotor, the center-to-center spacing between adjacent members of said linear array of movable input spring contacts being C degrees, said linear array of movable input spring contacts sliding along said linear array of stationary input contacts, a set of N movable output spring contacts mounted on said insulating rotor, each movable output spring contact remaining in contact with its respective one of said elongated stationary output contacts in all of said switch positions, a set of N electrical conductors mounted on said insulating rotor, each electrical conductor connecting a different member of said linear array of movable input spring contacts to its corresponding member of said set of movable output spring contacts.

2. The apparatus of claim 1 in which each of said electrical conductors is a strip of spring metal which is of the same basic composition as the two spring contacts it connects, said two contacts and said electrical conductor being formed together from one strip of spring metal.

3. The apparatus of claim 1 in which said input and output stationary contacts are printed on said stationary circuit board.

4. The apparatus of claim 1 in which said tone generator circuits are mounted on said stationary circuit board.

* * * * *